US011585209B2

(12) United States Patent
Griffing et al.

(10) Patent No.: US 11,585,209 B2
(45) Date of Patent: Feb. 21, 2023

(54) MAGNETIC SENSOR ROTATION AND ORIENTATION ABOUT DRILL

(71) Applicant: Halliburton Energy Services, Inc., Houston, TX (US)

(72) Inventors: Matthew Chase Griffing, Kingwood, TX (US); Wenquan Li, Kingwood, TX (US); Jesse Kevin Hensarling, Cleveland, TX (US); John Harrison Farrah, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/424,568

(22) Filed: May 29, 2019

(65) Prior Publication Data
US 2022/0325617 A1    Oct. 13, 2022

Related U.S. Application Data

(62) Division of application No. 15/031,529, filed as application No. PCT/US2014/072920 on Dec. 31, 2014, now Pat. No. 10,358,910.

(51) Int. Cl.
*E21B 47/0228* (2012.01)
*E21B 47/13* (2012.01)
(Continued)

(52) U.S. Cl.
CPC ............ *E21B 47/0228* (2020.05); *E21B 7/04* (2013.01); *E21B 43/2406* (2013.01);
(Continued)

(58) Field of Classification Search
CPC .... E21B 47/0228; E21B 47/092; E21B 47/13; E21B 7/04; E21B 44/005; E21B 47/022; E21B 47/024
See application file for complete search history.

(56) References Cited

U.S. PATENT DOCUMENTS 5,589,775 A     12/1996  Kuckes
6,739,409 B2 *   5/2004  Kruspe .................... G01V 3/32
                                                          175/50
(Continued)

FOREIGN PATENT DOCUMENTS

WO        2014-089505 A1    6/2014

OTHER PUBLICATIONS

International Search Report and Written Opinion issued in related PCT Application No. PCT/US2014/072920 dated Sep. 9, 2015, 13 pages.
(Continued)

*Primary Examiner* — Caroline N Butcher
(74) *Attorney, Agent, or Firm* — Benjamin Ford; C. Tumey Law Group PLLC

(57) ABSTRACT

A drilling system, comprising a drill string; and a ranging tool mounted on the drill string, the ranging tool comprising a magnetic sensor pair comprising a first magnetic sensor and a second magnetic sensor mounted radially opposite one another on the ranging tool, wherein each of the magnetic sensors is structured and configured to detect at least a radial component and a tangential component of a magnetic field; a rotatable assembly, comprising a motor structured and arranged to actuate rotation of the magnetic sensor pair around the drill string; and an electronics package connected to at least one of the magnetic sensor pair, and the motor, wherein the electronics package comprises a controller and a wireless telemetry device.

16 Claims, 9 Drawing Sheets

(51) Int. Cl.
    *E21B 47/092*     (2012.01)
    *E21B 7/04*     (2006.01)
    *E21B 47/024*     (2006.01)
    *G01V 3/26*     (2006.01)
    *E21B 43/24*     (2006.01)
    *E21B 44/00*     (2006.01)

(52) U.S. Cl.
    CPC .......... *E21B 44/005* (2013.01); *E21B 47/024* (2013.01); *E21B 47/092* (2020.05); *E21B 47/13* (2020.05); *G01V 3/26* (2013.01)

(56) References Cited

U.S. PATENT DOCUMENTS

| | | |
|---|---|---|
| 9,581,718 B2 | 2/2017 | Rodney |
| 9,605,527 B2 | 3/2017 | Reiderman et al. |
| 2005/0193811 A1 | 9/2005 | Bilby et al. |
| 2005/0194182 A1 | 9/2005 | Rodney et al. |
| 2008/0018334 A1 | 1/2008 | Reiderman |
| 2009/0030615 A1 | 1/2009 | Clark |
| 2009/0120691 A1* | 5/2009 | Waters ............... E21B 7/04 175/45 |
| 2009/0201026 A1 | 8/2009 | McElhinney |
| 2009/0222209 A1 | 9/2009 | Morys |
| 2011/0282583 A1 | 11/2011 | Clark |
| 2011/0308794 A1 | 12/2011 | Bittar et al. |
| 2013/0154650 A1 | 6/2013 | Bittar et al. |
| 2014/0007646 A1 | 1/2014 | Rodney et al. |
| 2014/0111210 A1* | 4/2014 | Fang ............... E21B 47/022 324/346 |
| 2015/0331138 A1 | 11/2015 | Estes et al. |
| 2015/0378043 A1* | 12/2015 | Brooks ............... G01P 15/00 702/9 |
| 2015/0378044 A1 | 12/2015 | Brooks |

OTHER PUBLICATIONS

International Preliminary Report on Patentability issued in related Application No. PCT/US2014/072920, dated Jul. 13, 2017, 10 pages.

* cited by examiner

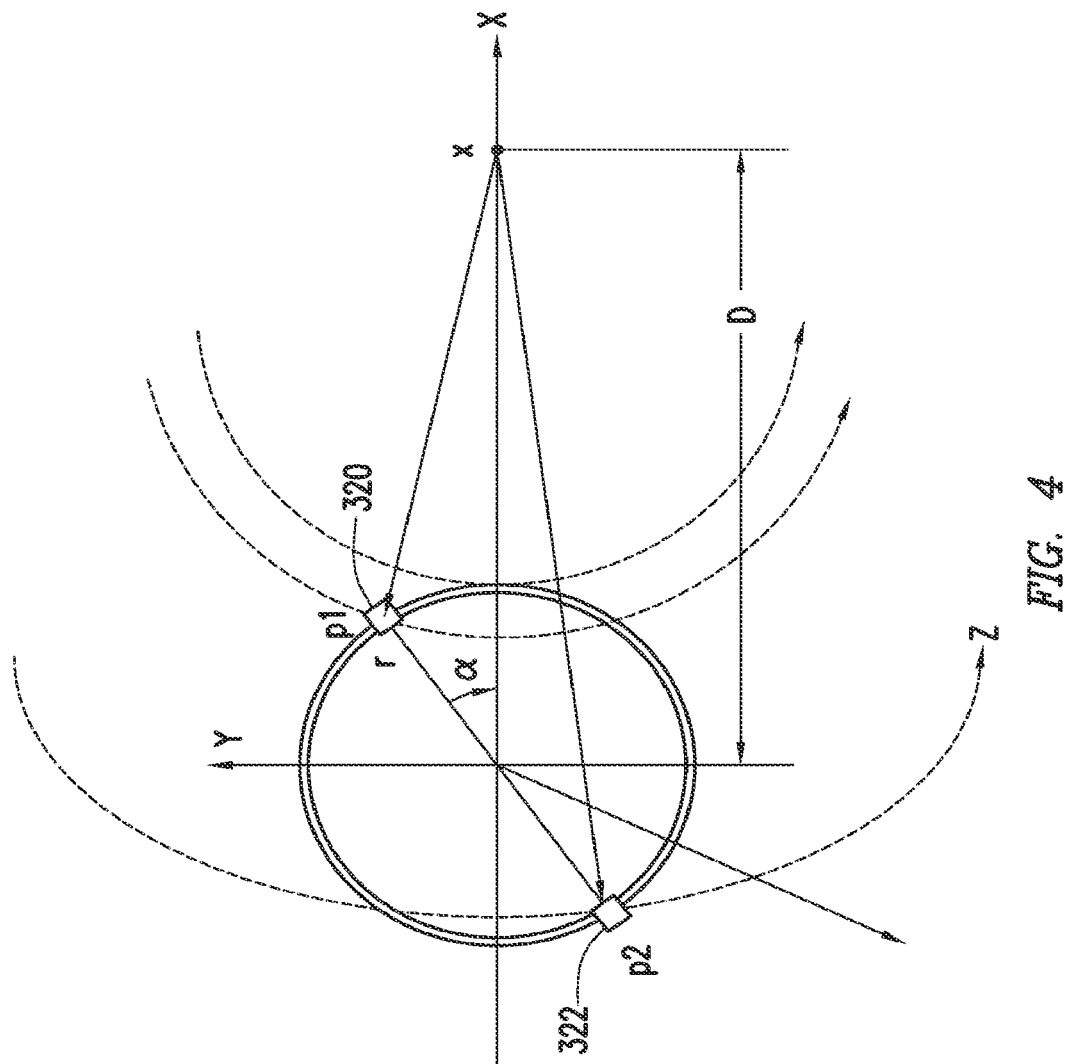

MAGNETIC SENSOR ROTATION AND ORIENTATION ABOUT DRILL

CROSS-REFERENCE TO RELATED APPLICATIONS

This application claims priority to and is a divisional application of U.S. application Ser. No. 15/031,529 filed on Apr. 22, 2016 entitled "MAGNETIC SENSOR ROTATION AND ORIENTATION ABOUT DRILL," which is a National Stage application of International application No. PCT/US2014/072920 filed Dec. 31, 2014, both of which are incorporated herein by reference in their entirety for all purposes.

BACKGROUND

The present disclosure relates generally to well drilling operations and, more particularly, to detection and location of proximate well casings during drilling.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

During drilling operations of hydrocarbon producing wells, it may be necessary to drill a wellbore with a location and geometry dependent on an existing wellbore. For example, in Steam Assisted Gravity Drainage (SAGD) drilling operations, a production well is typically drilled though a formation horizontally and a steam injection well is then drilled to be a given distance above the production well, e.g., five meters above the production well. Steam is then injected into the steam injection well to raise the temperature of surrounding hydrocarbon-containing formation. As the hydrocarbon-containing formation is heated, the viscosity of surrounding hydrocarbon may decrease and/or surrounding hydrocarbons may flow from the formation into the production well. This SAGD production system has been used to produce hydrocarbons too viscous to be produced as a liquid or gas in its natural state. For example, hydrocarbon-containing compounds have been produced from bituminous sands (or "tar sands") using an SAGD system.

In addition, in some well intervention operations a second wellbore may be required that intersects and/or connects with a first wellbore. For example, a second wellbore may be used to relieve pressure on the first wellbore, direct fluids away from the first wellbore, and/or otherwise intervene with the first wellbore when access from the surface is unavailable. To accomplish this interfacing of two wellbores within the formation, the first well typically must be located within the formation to determine the location of the second well.

For drilling operations where the location of the drilled wellbore depends on the location of another wellbore, it is desirable for a drilling operator to have the ability to determine the distance and/or location of a proximate wellbore and make adjustments to the drilling operation as a result.

FIGURES

Some specific exemplary embodiments of the disclosure may be understood by referring, in part, to the following description and the accompanying drawings.

FIG. 4 is a diagram of an example ranging tool in a misaligned orientation with respect to a production well, according to aspects of the present disclosure.

Figure 1:
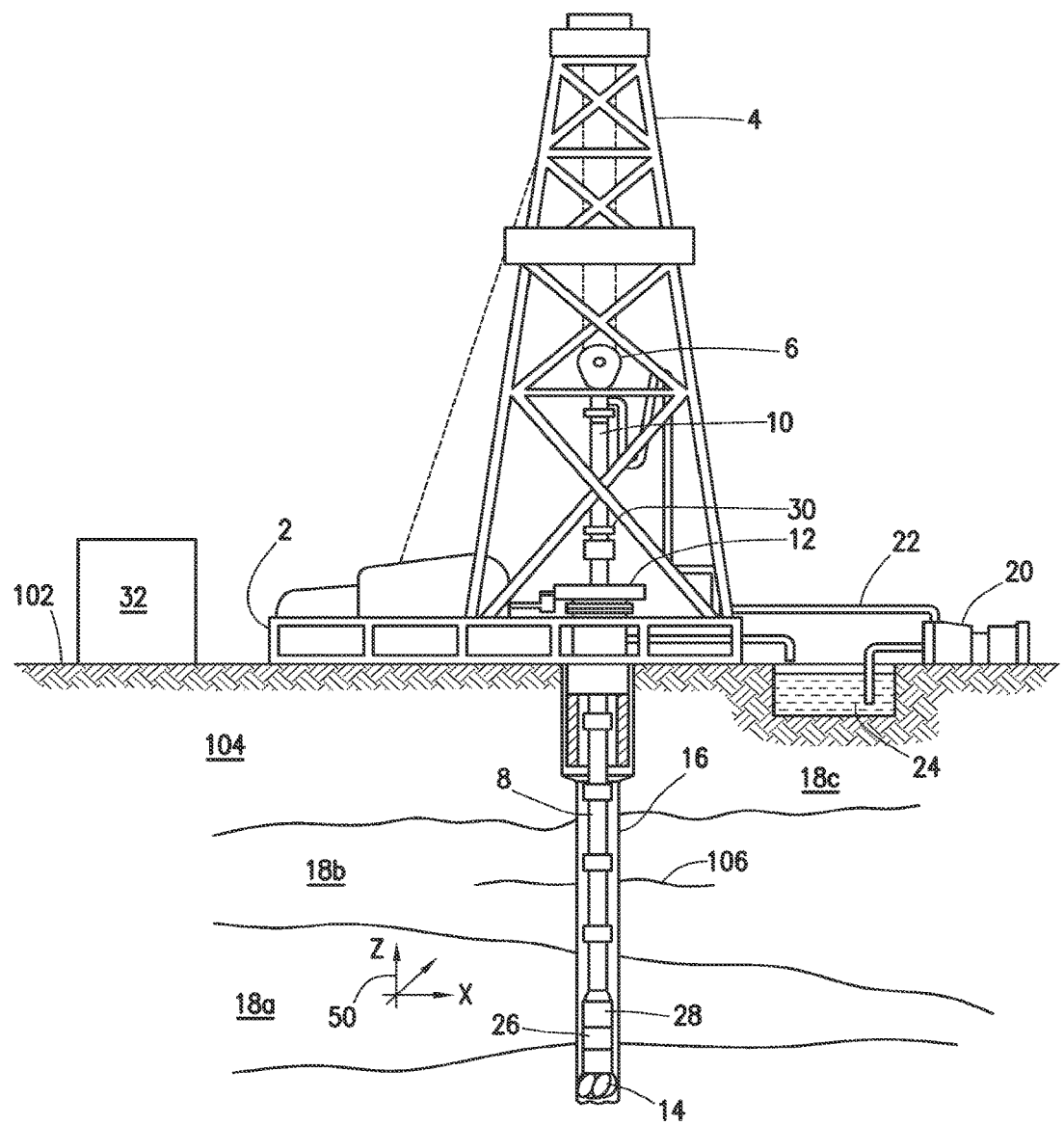
FIG. 1 is a diagram showing an illustrative logging while drilling environment, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

FIG. 1 is a diagram of a subterranean drilling system 100, according to aspects of the present disclosure. An X, [Y], Z coordinate system is shown at 50. The drilling system 100 comprises a drilling platform 2 positioned at the surface 102. In the embodiment shown, the surface 102 comprises the top of a formation 104 containing one or more rock strata or layers 18a-c, and the drilling platform 2 may be in contact with the surface 102. In other embodiments, such as in an off-shore drilling operation, the surface 102 may be separated from the drilling platform 2 by a volume of water.

The drilling system 100 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 100 may comprise a bottom hole assembly (BHA) coupled to the drill string 8 near the drill bit 14. The BHA may comprise various downhole measurement tools and sensors and LWD and MWD elements, including a ranging tool 26. The ranging tool 26 may comprise at least one transmitter and receiver capable of communicating with adjacent and/or proximate tool electronics located on the drill string 8. As the bit extends the borehole 16 through the formations 18, the ranging tool 26 may collect measurements relating to magnetic field strength, e.g., the strength of a magnetic field generated by a metallic structure located within the formation 104. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments. In embodiments including an azimuthal orientation indicator, the ranging measurements may be associated with a particular azimuthal orientation through azimuthal binning, as will be described below.

In certain embodiments, the ranging tool 26 may also include a control unit (not shown) coupled to the transmitters and receivers that controls their operation, stores measurements, and in certain instances processes the magnetic field measurements to determine a distance from a magnetic field generating object, and in conjunction with azimuthal orientation indicator/sensor data, may determine the direction of a magnetic field generating object. Example control units may include microcontrollers and microcomputers and any other device that contains at least one processor communicably coupled to memory devices containing a set of instructions that when executed by the processor, cause it to perform certain actions. In certain embodiments, a control unit of the ranging tool 26 may be communicably coupled to other controllers within the BHA.

The BHA may also include a steering tool 34 that controls the direction of the drill bit 14 and, therefore, the direction in which the borehole 16 will be drilled. Example steering tools include point-the-bit and push-the-bit type systems. One use of the steering tool 34 is to direct the drill bit 14 and borehole 16 to one of the formation strata 18*a-c* that contains hydrocarbons. Other uses include avoiding certain undesired strata or formation bodies, following existing borehole, maintaining a distance from an adjacent wellbore, or intersecting existing borehole to drill relief wells in the case of a blowout. In certain embodiments, the steering tool 34 may include a separate control unit (not shown) that controls the operation of the steering tool 34. The control unit may be communicably coupled to other controllers within the BHA, such as a control unit within the resistivity logging tool 26, and may alter its operation depending on measurements or signals received from the other controllers.

The tools and sensors of the BHA including the ranging tool 26 may be communicably coupled to a telemetry element 28. The telemetry element 28 may transfer measurements from the ranging tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the ranging tool 26 may also be stored within the tool 26 or the telemetry element 28 for later retrieval at the surface 102.

In certain embodiments, the drilling system 100 may comprise an information handling system 32 positioned at the surface 102. The information handling system 32 may be communicably coupled to the surface receiver 30 and may receive measurements from the ranging tool 26 and/or transmit commands to the ranging tool 26 though the surface receiver 30. The information handling system 32 may also receive measurements from the ranging tool 26 when the tool 26 is retrieved at the surface 102. As will be described below, the information handling system 32 may process the magnetic field measurements and/or azimuthal orientation to determine a distance from and/or direction of the magnetic field generating object.

At various times during the drilling process, the drill string 8 may be removed from the borehole 16. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may include a ranging tool 36 having at least one magnetic sensor pair structured and arranged to measure the magnetic field and/or the magnetic field gradient generated by a metallic object, similar those described above in relation to the ranging tool 26. The ranging tool 36 may be communicatively coupled to the cable 15. A logging facility 44 (a truck, although it may be any other structure) may collect measurements from the ranging tool 36, and may include computing facilities (including, e.g., a control unit) for controlling, processing, storing, and/or visualizing the measurements gathered by the ranging tool 36. The computing facilities may be communicatively coupled to the ranging tool 36 by way of the cable 15. In certain embodiments, the surface control unit 32 may serve as the computing facilities of the logging facility 44.

Figure 2:
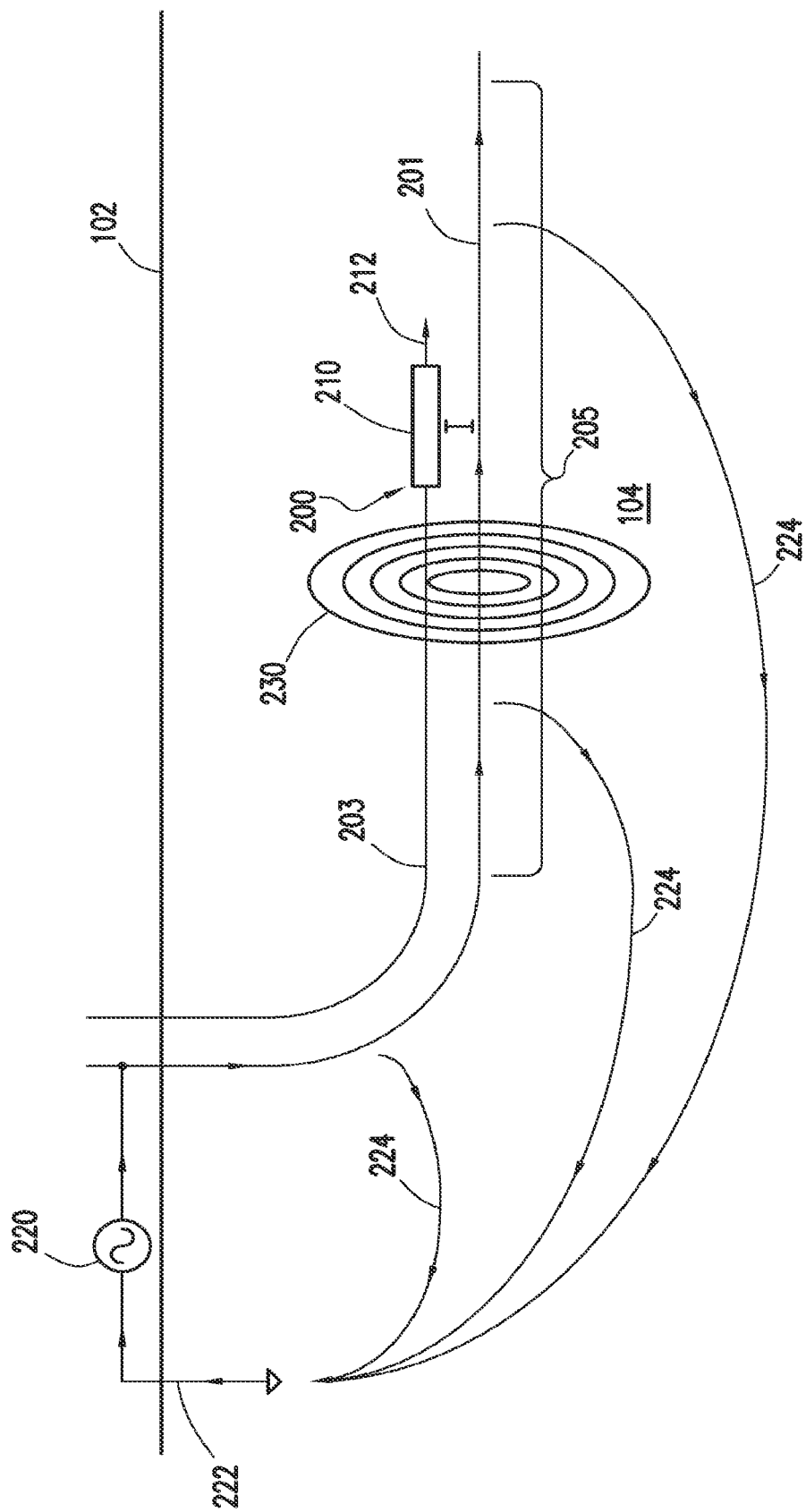
FIG. 2 is a diagram showing an example steam well being drilled for a steam assisted gravity drainage operation, according to aspects of the present disclosure.

FIG. 2 shows a schematic of a production well 201 and a drill string 200 in the process of drilling a proximate well 203, e.g., a steam injection well. In certain embodiments, hydrocarbons may flow into the production well 201 to be captured and/or produced from the formation 104. In certain embodiments, the proximate well 203 may be an injection well used to stimulate the flow of hydrocarbons into the production well 201. The drill string 200 may comprise a ranging tool 210 and a drill bit 212. In certain embodiments, the production well 201 and the proximate well 203 may comprise a steam assisted gravity drainage (SAGD) system. The production well 201 may comprise a production section 205 extending through the formation 104 in a lateral direction, substantially parallel with the surface 102. In certain embodiments, it may be desirable to drill the proximate well 203 substantially parallel with and directly above the production section 205 of the production well 201 so that the distance between the proximate well 203 and the production section 205 is substantially constant. For example, in certain embodiments, the proximate well 203 and the production section 205 may be 3 meters to 10 meters apart. For example, the proximate well 203 may be 5 meters (±1 meter) from the production section 205. As such, the location of the proximate well 203 may depend on the position of the production well 201 within the formation.

In certain embodiments, the production well 201 may comprise a casing. The casing may be excited with an electric current. In certain embodiments, a power amplifier 220 may be used to generate the electric current. In certain embodiments, the electric current may have a low frequency, for example, less than 100 Hz. For example, the electric current may have a frequency of less than 10 Hz. The electric current may flow down the casing in the production well 201 and through the formation 104 to at least one ground rod 222. The ground rod 222 may be placed such that the electric current bleed-off 224 is guided away from the drilling system 200 and/or proximate well 203 so that the electric current bleed-off 224 minimally interferes with the ranging tool 210 on the drilling system 200. For example, as shown in FIG. 2, the ground rod 222 may be placed opposite the direction that the production section 205 extends. In certain embodiments, the ground rod 222 may be placed 0.5 km to 4 km away from the production well 201. For example, the ground rod may be placed 1 km away from the production well 201.

In certain embodiments, the casing may be excited to delineate the production well's location. However, consistent with the present disclosure, other conductive materials may be used to guide electric current through the length of the production well 201.

The electric current flowing through the casing or conductive material may create a magnetic field 230 thereabout. The ranging tool 210 may measure a gradient magnetic field strength in a radial direction to determine the distance from the production well, as will be discussed further herein. In certain embodiments, the ranging tool 210 may also use the component (R, T, and Z) field strength measurements in conjunction with the azimuthal orientation data to determine the direction of the production well.

Figure 3:
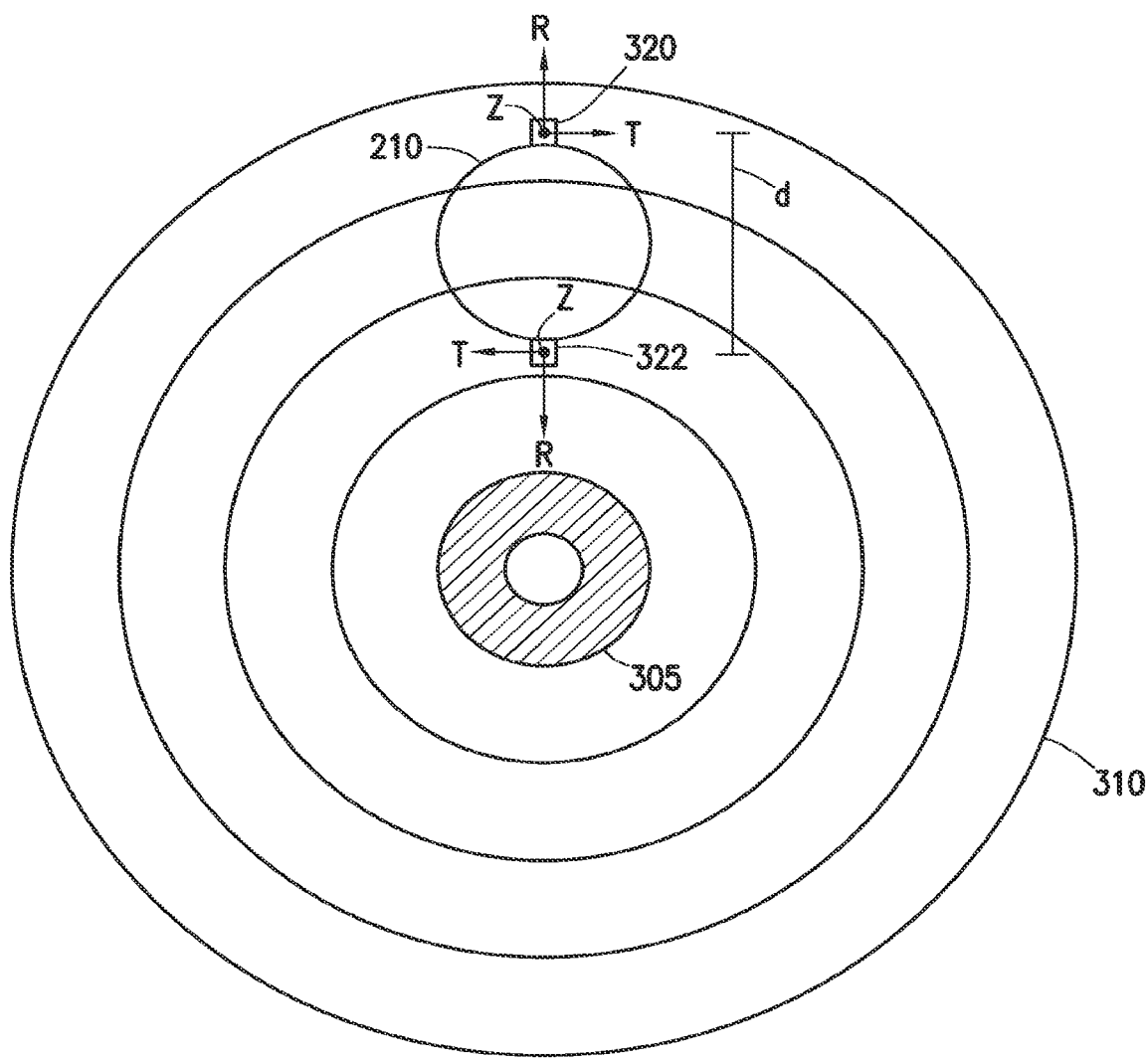
FIG. 3 is a diagram of an example ranging tool proximate to a production well producing a magnetic field, according to aspects of the present disclosure.

Referring to FIG. 3, a cross-section of a casing 305 within a production well is shown creating a magnetic field 310. The magnetic field 310 may extend radially from the casing 305 and weaken as a function of distance from the casing 305. The ranging tool 210 may be located within the magnetic field 310.

In certain embodiments, the ranging tool 210 may comprise a first magnetic sensor 320 and a second magnetic sensor 322, positioned on the ranging tool 210 substantially opposite one another (i.e. substantially 180 degrees from one another). The magnetic sensors substantially opposite one another are referred to herein as a "magnetic sensor pair." The magnetic sensors 320, 322 may sense at least two perpendicular directional components of the magnetic field 310 (a radial (R) component and a tangential (T) component). In certain embodiments, the magnetic sensors 320, 322 may also sense a Z component of the magnetic field 310. In certain embodiments, the magnetic sensors 320, 322 may be oriented such that the Z component extends in a lengthwise direction of the drill collar (orthogonal to the view shown in FIG. 3), where the respective Z components point in the same direction. In certain embodiments, the respective R components of the magnetic sensor pair may point away from the center of the drill collar, in substantially opposite directions, and the T components may be tangential to the ranging tool 210.

When located within the magnetic field 310 generated by the production well 305, the first magnetic sensor 320 may measure a first magnetic field strength and the second magnetic sensor 322 may measure a second magnetic field strength. A magnetic field gradient may be determined from the magnetic field strength measured by the first and second magnetic sensors 320, 322, as shown by Equation 1:

$$\text{gradient}(H) = \frac{|H_1 - H_2|}{d} \tag{1}$$

where gradient(H) is the measured gradient of the magnetic field, $H_1$ and $H_2$ is the magnetic field strength measured by the respective magnetic sensors 320, 322, and d is the distance between the sensors measured in the radial direction.

The magnetic sensors 320, 322 are oriented in FIG. 3 to be aligned in the radial direction with respect to the production well. As used herein, the term "aligned" will be used to mean radial alignment with the production well as shown in FIG. 3. In this orientation, the magnetic field gradient is measured entirely in tangential components (T) of the magnetic sensors 320, 322. As such, in this orientation, only the T components are needed to calculate the ranging distance. In addition, the maximum Signal-to-Noise Ratio (SNR) may be achieved in this orientation since the magnetic sensors are at a maximum radial distance d from one another and the radial components (R) are close to or equal to zero, which simplifies the calculations needed to determine the ranging distance. When the magnetic sensors are in alignment with the producer, the tools/sensors azimuthal orientation may be sufficient to determine direction of the producer without needing to determine an angle between the sensors and producer using field strength components. In certain embodiments, using tool orientation to determine direction may reduce error involved directional measurements using magnetic field sensors.

The ranging measurement calculation is represented by Equation 2 when the magnetic sensors are substantially misaligned, as shown in FIG. 4. If the two sensors 320, 322 have an angle α with respect to the X-axis (with the production well 305 on the X-axis), then the distance D from the production well 305 is represented by Equation 2:

$$D(r, \alpha, B1, B2) = \tag{2}$$
$$r \cdot \left[ \left| \frac{B2^2 + B1^2}{|B1| - |B2|} \cdot \frac{\cos(\alpha)}{|B1| + |B2|} \right| + \sqrt{\left( \frac{B2^2 + B1^2}{|B1| - |B2|} \cdot \frac{\cos(\alpha)}{|B1| + |B2|} \right)^2 - 1} \right]$$

where B1 is the absolute value of the total magnetic field measured by the first magnetic sensor 320, B2 is the absolute value of the total magnetic field measured by the second magnetic sensor 322, and r is the radius of the ranging tool. When α=0 (when the magnetic sensors are aligned), Equation 2 may be simplified as:

$$D(r, B1, B2) = r \cdot \left[ \frac{B1 + B2}{B1 - B2} \right] \tag{3}$$

In addition, eddy currents generated on the metallic body/chassis of the tool due to the magnetic field of the producer well may be a source of error in the ranging measurement. Considering the effect of eddy currents at α=0, Equation 3 can be written as:

$$D(B1, B2, r, b1, b2) = r \cdot \left[ \frac{(B1 + b1) + (B2 + b2)}{(B1 + b1) - (B2 + b2)} \right] \tag{4}$$

where b1 is the absolute value of the tangential magnetic field generated by eddy currents at the first magnetic sensor 320, and b2 is the absolute value of the tangential magnetic field generated by eddy currents at the second magnetic sensor 322. Since r is very small compared with distance D, the difference between b1 and b2 may be approximated to be about 0. Similarly, the values of b1 and b2 are very small as compared with B1 and B2. As such, even with the effect of eddy currents at α=0, the ranging distance error according to Equation 4 may remain very small and readily quantifiable due to the alignment of the magnetic sensors.

In certain embodiments, the ranging tool is stationary while the gradient measurement is made. To be stationary, the drilling operator must stop drilling and/or stop rotating the tool string for each ranging measurement. In certain embodiments, the drilling operator may not have control of how the drill string is oriented when it comes to a complete stop. As a result, a ranging tool mounted on the drill string may have an uncontrolled alignment with the production well and is unlikely to be substantially aligned. As discussed above, more complex calculations that inherently have lower SNR and resolution may be required with such an uncontrolled orientation.

Figure 5C:
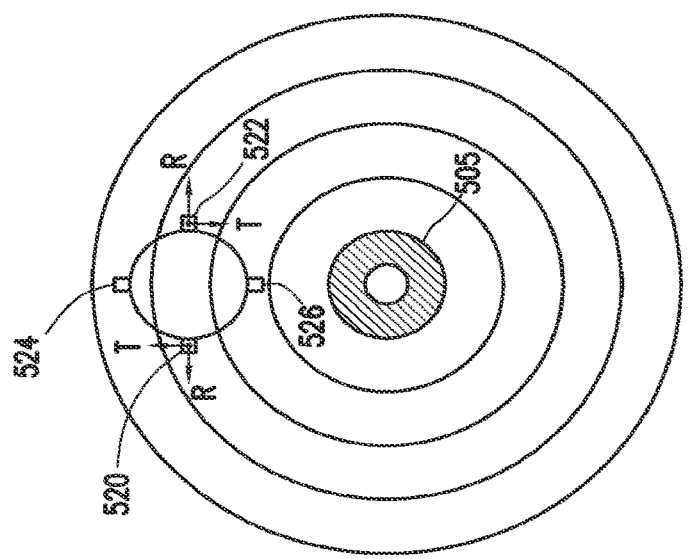
FIG. 5C is a diagram of an example ranging tool proximate to a production well producing a magnetic field in a misaligned orientation where magnetic sensors are oriented in a blind orientation, according to aspects of the present disclosure.
Figure 5B:
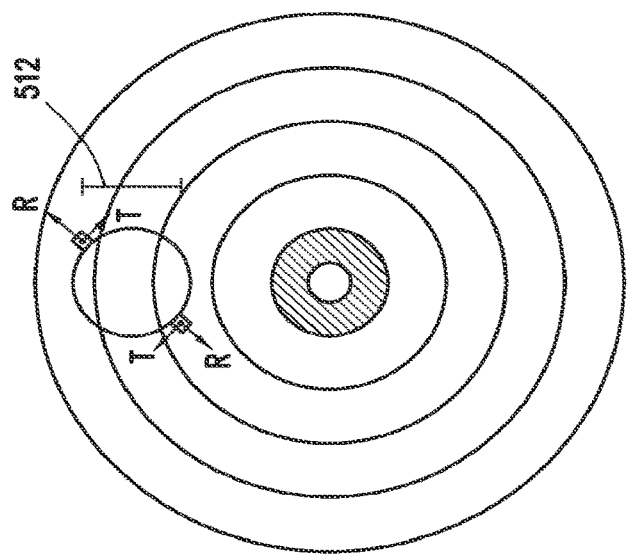
FIG. 5B is a diagram of an example ranging tool proximate to a production well producing a magnetic field in a misaligned orientation, according to aspects of the present disclosure.
Figure 5A:
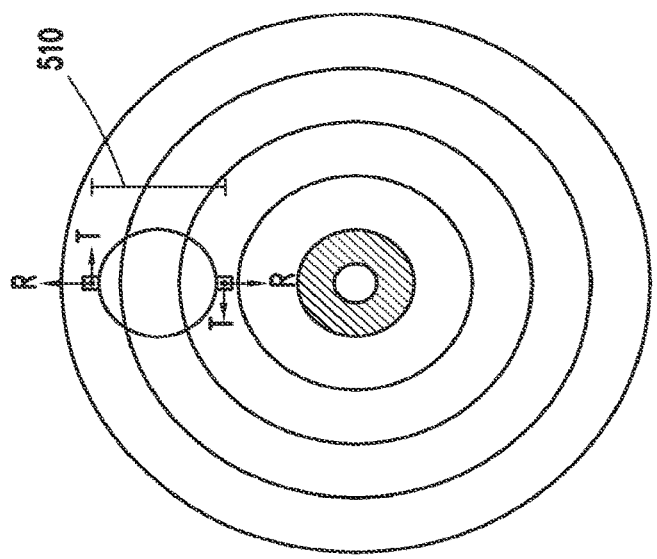
FIG. 5A is a diagram of an example ranging tool proximate to a production well producing a magnetic field in an aligned orientation, according to aspects of the present disclosure.

FIGS. 5A-5C show a range of ranging tool orientations with respect to the production well. FIG. 5A shows an ideal alignment with a gradient distance 510 is at a maximum. FIG. 5B shows a skewed alignment with a gradient distance 512 smaller than the gradient distance in ideal alignment. In addition, as shown in FIG. 5C, the ranging tool may stop in a "blind" orientation with respect to the production well 505, where the both magnetic sensors 520, 522 are an equal radial distance from the producer and therefore see an equal magnetic field strength, where a magnetic field gradient measurement may be close to zero. In this case, the ranging tool may comprise a second magnetic sensor pair 524, 526 placed orthogonal to the first magnetic sensor pair 520, 522. In certain embodiments, the ranging tool may select the magnetic sensor pair that has the greatest gradient measurement, and is therefore closest to ideally aligned. In certain embodiments, the ranging tool may use the magnetic sensor pair with the greatest gradient measurement to obtain a primary distance measurement and the other magnetic sensor pair to obtain a secondary distance measurement. The secondary distance measurement may be used as a redundant verification on the primary distance measurement.

In certain embodiments, the drill operator may slowly rotate the tool string in an attempt to bring the magnetic sensor pair into alignment with the production well. A continuous telemetry uplink between the ranging tool and the surface may allow the ranging tool to communicate when the T components are at a maximum and/or the R components are at a minimum, which may indicate that the magnetic sensor pair is in alignment. The ranging tool may comprise a transmitter. In certain embodiments, the transmitter may be an electromagnetic transmitter or a mud pulse telemetry transmitter. For example, an electromagnetic transmitter may be used to wirelessly transmit data while the ranging tool is not measuring the magnetic field or the magnetic field gradient, and/or the electromagnetic transmitter may transmit at a frequency that does not interfere with the magnetic field measured by the magnetic sensor pair.

Figure 6A:
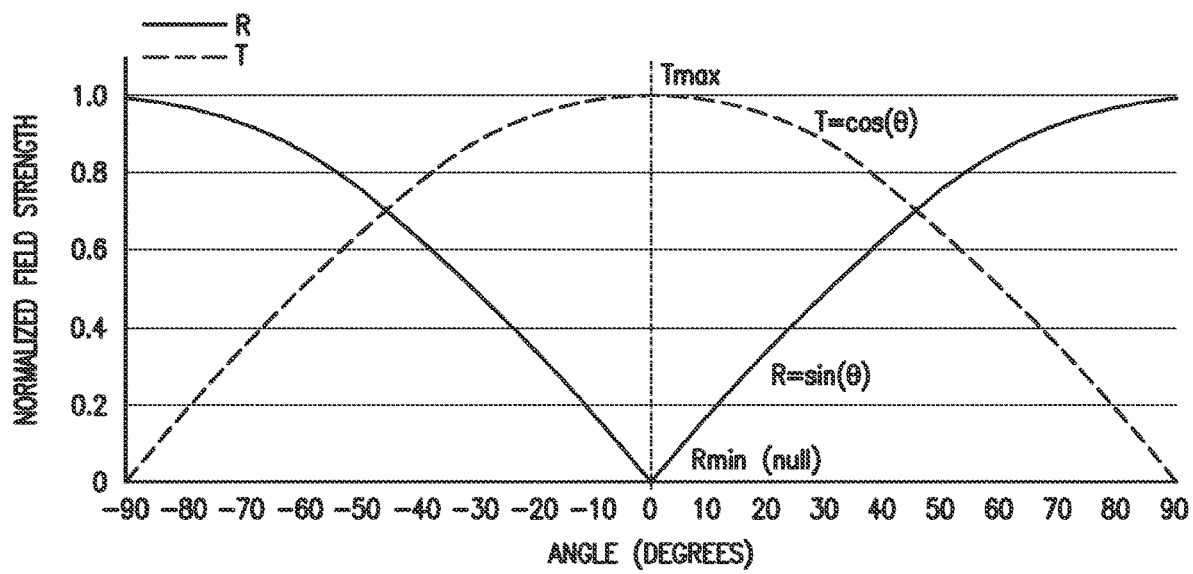
FIG. 6A is a graph illustrating field strength of the measured magnetic field over a range of orientations, according to aspects of the present disclosure.
Figure 6B:
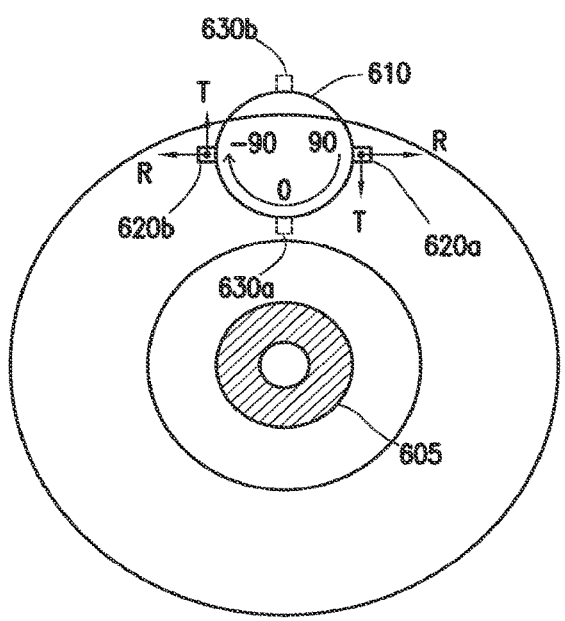
FIG. 6B is a diagram of an example ranging tool showing the range of magnetic sensor orientations from −90 degrees to 90 degrees represented in FIG. 6A, according to aspects of the present disclosure.

FIG. 6A shows a graph of the normalized magnetic field strength for the R and T components vs. the magnetic sensor pair orientation with the production well, corresponding to the range of magnetic sensor pair orientations shown in FIG. 6B. FIG. 6B shows an example ranging tool 610 comprising a magnetic sensor pair comprising a first magnetic sensor 620a and a second magnetic sensor 620b in −90, 0, and +90 degree orientations. Show first at the −90 degree orientation, the magnetic sensors 620a and 620b may be equidistant from an excited metallic structure 605, where the first magnetic sensor 620a may be on the right of the ranging tool 610 and the second magnetic sensor 620b may be on the left of the ranging tool 610. This orientation may be referred to as a blind orientation, as discussed above, since the magnetic field gradient measured by the magnetic sensor pair may provide little to no distance information for the metallic structure 605. Once the ranging tool rotates clockwise 90 degrees, the first magnetic sensor 620a may be in a near aligned position 630a closest to the metallic structure and the second magnetic sensor 630b may be in a far aligned position 630b away from the metallic structure. This position may be referred to as the aligned position, or ideal position, and is represented as a 0 degrees orientation on FIG. 6A. (Although the ranging tool is shown rotating clockwise in this example, the ranging tool may rotate in a clockwise or a counterclockwise direction.) Rotating the ranging tool a further 90 degrees in the clockwise direction brings the magnetic sensor pair into a +90 degrees orientation, where the first magnetic sensor 620a is in the position initially occupied by the second magnetic sensor 620b, and vice versa.

Referring back to FIG. 6A, the T component may be at a maximum when the magnetic sensor pair is aligned with the production well, shown at 0 degrees. At this point of ideal alignment, the R component may have a sharp minimum at 0 field strength while the field strength measured by the T component may have a rounded maximum peak. In certain embodiments, the operator may rotate the drill string and/or ranging tool until the R component measures a minimum field strength in order to align the ranging tool. In certain embodiments, the operator may rotate the drill string and/or ranging tool until the T component measures a maximum field strength in order to align the ranging tool. Manually aligning the ranging tool for each measurement may be time consuming and difficult since the drill string may be hard to precisely control.

Figure 7:
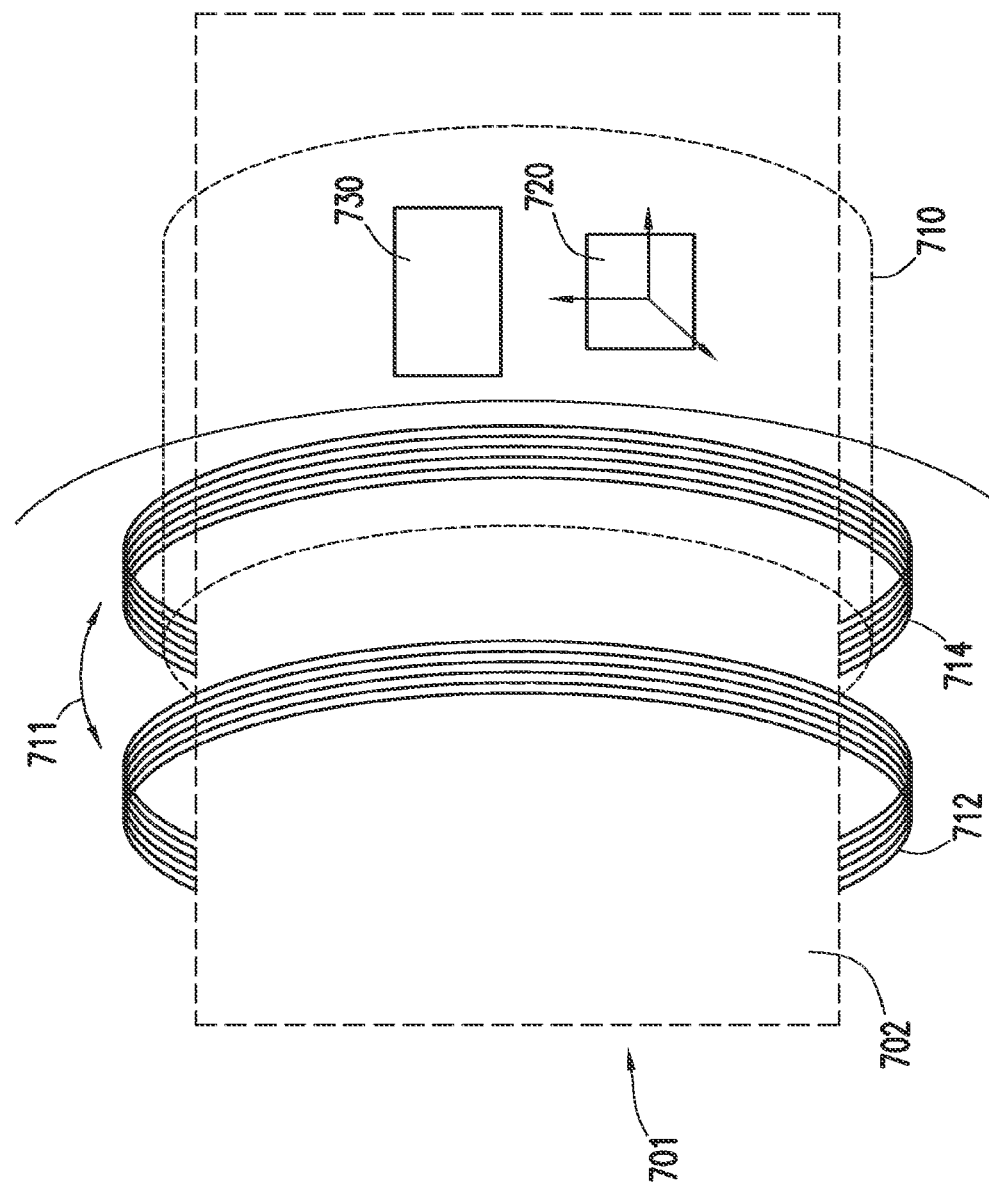
FIG. 7 is a diagram of an example ranging tool comprising a rotatable assembly, according to aspects of the present disclosure.

As shown in FIG. 7, in certain embodiments, the ranging tool 701 may comprise a rotatable assembly 710 rotatable around a ranging tool body 702. The magnetic sensor pair may be mounted on the rotatable assembly 710 (the first magnetic sensor 720 is visible in FIG. 7). In certain embodiments, an azimuthal orientation sensor (not shown) may be mounted to the rotatable assembly. The rotatable assembly 710 may comprise a motor to actuate rotation of the magnetic sensor pair around the ranging tool 701. In certain embodiments, the motor may be an electric motor. The motor may rotate the rotatable assembly slowly or in steps to minimize generation of frequencies that could interfere with the magnetic field. In addition, the motor may be placed away from the magnetic sensor to minimized interference with the magnetic field. In certain embodiments, the ranging tool 701 may comprise an electronics package 730 connected to the magnetic sensors and/or the azimuthal orientation sensor. The electronics package may comprise a battery and provide power to the magnetic sensors and/or the azimuthal orientation sensor. In certain embodiments, the ranging tool 701 may comprise carbon bushes, slip rings, and/or any other form of rotating electrical connection structured and arranged to provide power to the magnetic sensors and/or the azimuthal orientation sensor. In certain embodiments, the electronics package 730 may comprise a wireless interface that may transmit sensor data to adjacent tool electronics. The wireless transmitter may receive a digital signal from adjacent tool electronics, where the digital signal may comprise control commands from the surface.

In certain embodiments, the ranging tool 701 may comprise an inductive transformer coupling 711 between a first coil 712 attached to the ranging tool body 702 and a second coil 714. The inductive transformer coupling 711 may be connected to the electronics package, the magnetic sensor pair, and/or the azimuthal orientation sensor. The inductive transformer coupling 711 may be structured and arranged to generate power wirelessly while the first coil 712 and the second coil 714 rotate with respect to one another, using a Contactless Energy Transmission (CET) method. For example, the first coil 712 may be attached to the ranging tool body 702 and the second coil 714 may be attached to the rotatable assembly 710. The inductive transformer coupling 711 may be operable to generate AC power, and a power converter may convert the AC power to DC power. In certain embodiments, a soft ferrous material (not shown) may increase the coupling efficiency of the inductive coupling and/or insulate the magnetic fields radiated from the inductive transformer coupling 711.

In certain embodiments, the electronics package 730 may comprise a controller connected to the magnetic sensor pair and the motor. To take a distance measurement, the controller may receive magnetic field measurements from the sensor pair and determine if the R component of the magnetic sensor pair is at a null minimum, as discussed with reference to FIG. 6 above. The controller may signal the motor to rotate the rotatable assembly, causing the magnetic sensor pair to rotate, until the R component is at a minimum and/or the T component is at a maximum. For example, the controller may rotate the rotatable assembly so that the R component is within 10% of a minimum value and/or so that the T component is within 5% of a minimum value. For example, in certain embodiments, the controller may rotate the rotatable assembly so that the magnetic sensor pair is within 15 degrees of ideal alignment with the production well; for example, where the magnetic sensor is within 5 degrees of ideal alignment. In certain embodiments, the controller may align the ranging tool with the production well automatically, without assistance from the operator.

Once the controller determines that the R components are at a minimum, and therefore that the magnetic sensors are aligned, the controller may read the magnetic field measured by the magnetic sensor pair and/or azimuthal orientation measured by the azimuthal sensor. In certain embodiments, the controller may compute the distance and direction reading at the tool and send a computed distance to the surface. In certain embodiments, the controller may send the magnetic field measurement to the surface where a processor may compute the production well distance and direction. Once the production well distance and direction is received at the surface, it may be displayed to the operator at a computer. The operator may use the production well distance and direction to adjust direction of the drill or maintain course if the ranging tool is at a desired distance from and above the production well.

Figure 8:
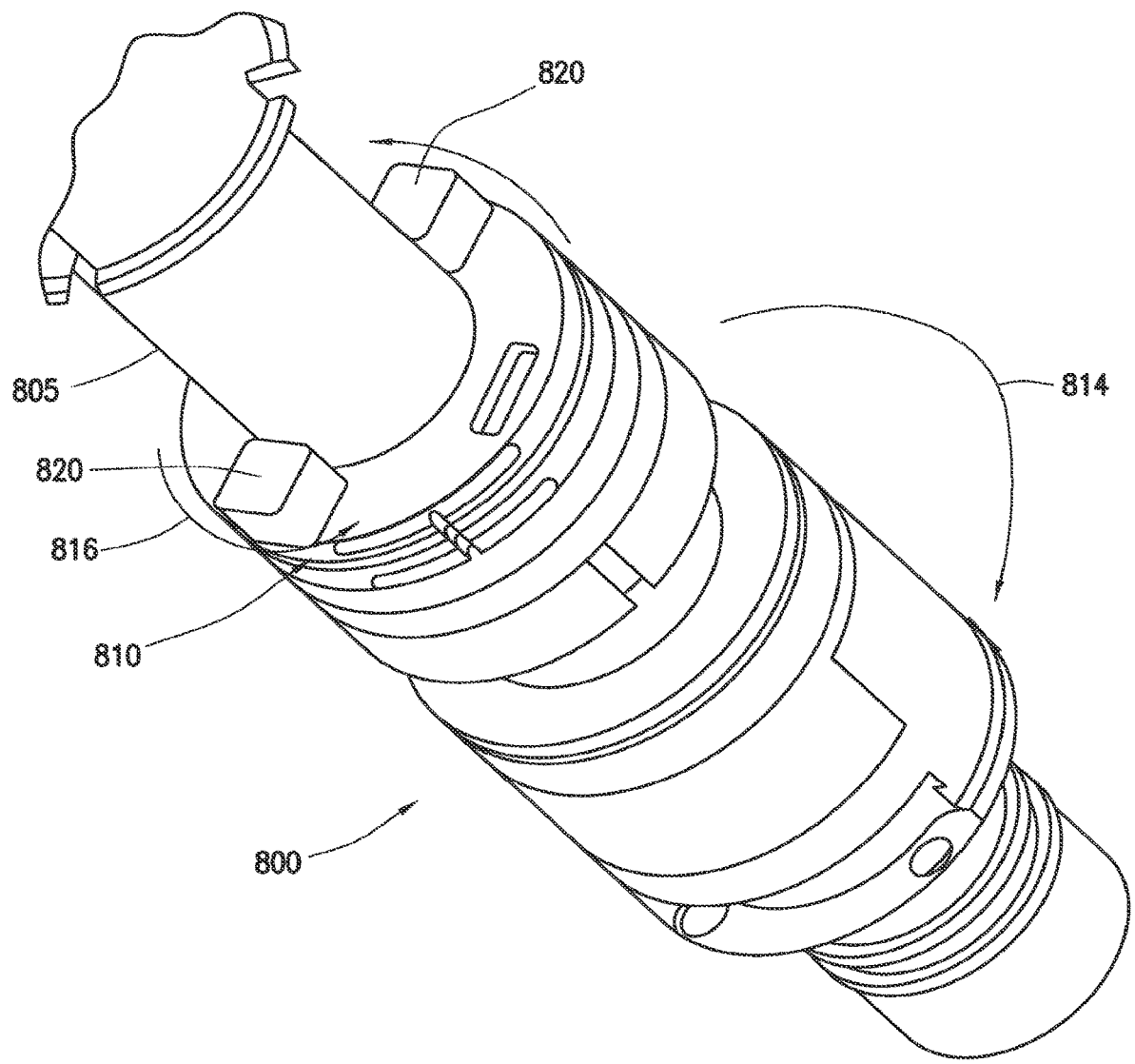
FIG. 8 is a diagram of an example ranging tool comprising a rotatable assembly, according to aspects of the present disclosure.

Referring now to FIG. 8, an example ranging tool 800 is shown comprising a rotatable assembly 810 comprising a magnetic sensor pair 820 and/or an azimuthal orientation sensor (not shown). The rotatable assembly 810 may mounted on a drill string 805 and be structured and arranged to rotate around the drill string 805. For example, given a clockwise drill string rotation (shown by arrow 814), the rotatable assembly may rotate in the opposite, counterclockwise direction (shown by arrow 816). In certain embodiments, the rotatable assembly may have a substantially equal and opposite rotation to the drill string rotation to keep sensor pair stationary and/or in the aligned orientation, e.g., keeping the ranging tool within 15 degrees of alignment with a production well. In certain embodiments, the rotatable assembly 810 may comprise at least one rotation sensor (not shown) mounted on the rotatable assembly 810. For example, in certain embodiments, the at least one rotation sensor may be a magnetometer. The at least one rotation sensor may detect rotation from the drill string 805 and send a control signal to the rotatable assembly 810 in response. For example, the at least one rotation sensor may send a control signal instructing the rotatable assembly 810 to rotate in the opposite direction of detected rotation from the drill string 805.

In certain embodiments, the rotatable assembly 810 may comprise at least one accelerometer (not shown) mounted on the rotatable assembly 810. The at least one accelerometer may be structured and arranged to detect vibration of the drill string 805 and/or the rotatable assembly 810. In response to a detected vibration, the at least one accelerometer may send a control signal instructing the rotatable assembly 810 to vibrate inverse to the drill string 805. As such, the at least one rotation sensor and/or the at least one accelerometer may keep the magnetic sensor pair 820 in a set radial and/or axial alignment respectively.

In certain embodiments, the rotatable assembly 810 may be mounted on a vibration damper (not shown). The vibration damper may dampen vibrations from the drill string on the magnetic sensors, reducing noise imputed to the magnetic sensors while drilling. In certain embodiments, the rotatable assembly may be mounted on an active vibration management (AVM) system. The AVM system may comprise a motor and a processor connected to the motor. The processor may receive movement information from an accelerometer located on the drill string and actuate the motor to vibrate the AVM system, and the rotatable assembly, in reverse of the drill string vibration to keep the rotatable assembly in place. In certain embodiments, the motor may be structured and arranged to vibrate the ranging tool opposite to the drill string vibration detected by the at least one accelerometer. For example, the at least one accelerometer may signal the motor to vibrate counter and/or inverse the drill string vibration. In this way, the motor may stabilize the ranging tool in response to drill string vibration.

In certain embodiments, the controller may be connected to, and be configured to receive drill string movement signals from, the at least one magnetometer and/or the at least one accelerometer; the controller may also be connected to, and be configured to receive alignment signals from, the magnetic sensor pair. As such, in certain embodiments, the controller may be configured to receive the R component and/or T component data to align the magnetic sensor pair with the production well and rotation and/or vibration data to maintain alignment.

In certain embodiments, the motor may rotate the rotatable assembly during drilling while the drill string rotates. In certain embodiments, the motor may rotate the rotatable assembly counter to the drill string rotation at the same speed or RPM as the drill string to keep the magnetic sensor assembly substantially aligned with the production well. As such, the ranging tool may be used to measure the magnetic field gradient to provide ranging information while drilling.

Figure 9:
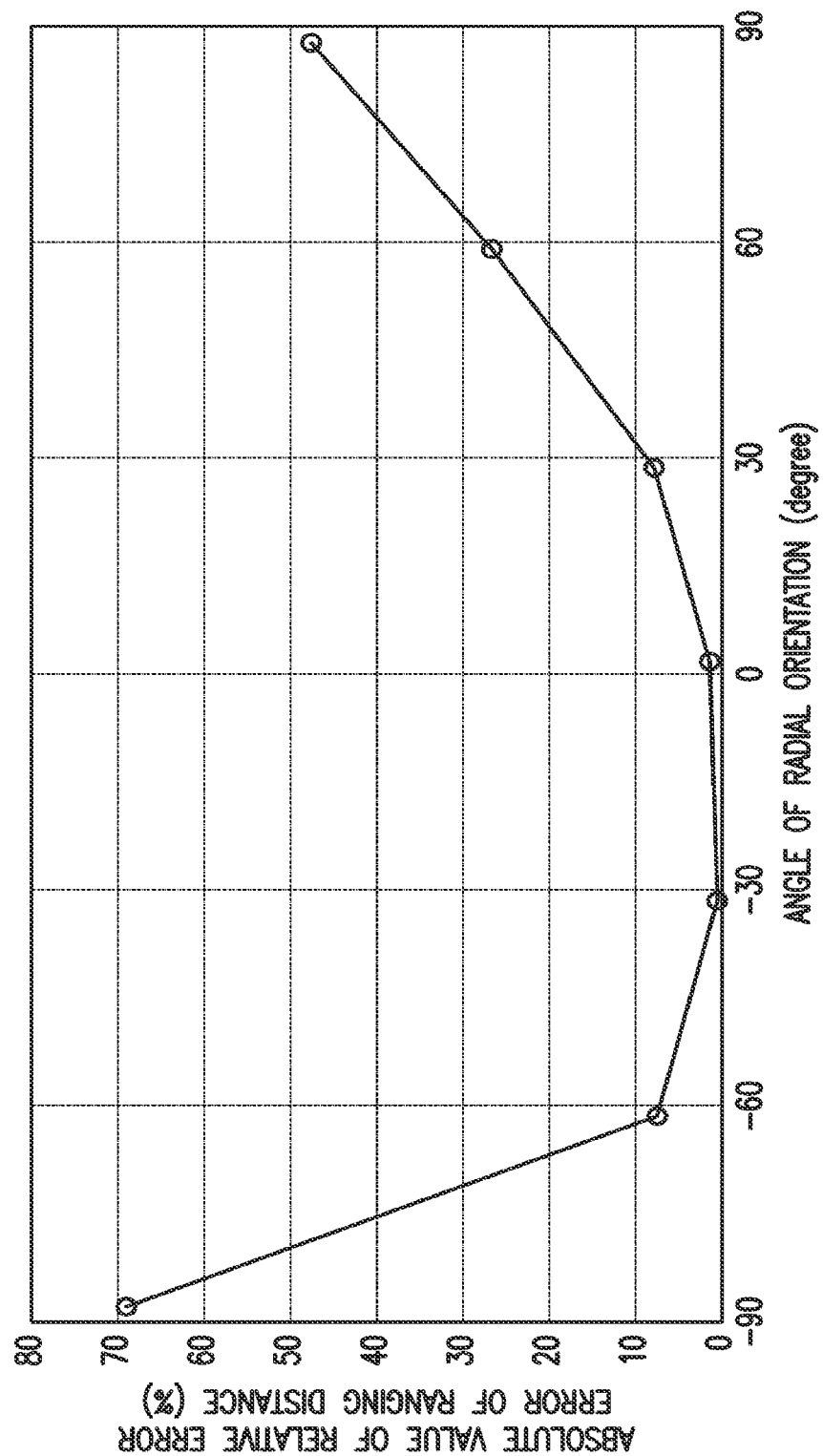
FIG. 9 is a graph illustrating the absolute percentage error of the distance measured by an example ranging tool as a function of radial orientation, according to aspects of the present disclosure.

Referring now to FIG. 9, a graph of absolute value of relative percent error of a distance measured by an example ranging tool is shown as a function of radial orientation (degrees) of the magnetic sensor pair. The magnetic sensor pair orientation ranges from −90 degrees to 90 degrees, as shown with reference to FIGS. 6A & 6B. At an orientation angle of 0 degrees, the magnetic sensor pair may be said to be axially aligned with the production well. At 0 degrees the magnetic sensor pair may measure the magnetic field and/or magnetic field gradient and obtain a distance measurement with minimal error. As the magnetic sensor pair moves away from an orientation of 0 degrees toward an orientation of 90 degrees or −90 degrees, the relative error of the distance measurement increases—up to about 70% as shown by example. In certain embodiments, measuring the magnetic field while the magnetic sensor pair is in substantial alignment with the production well may reduce error of the calculated distance away from the production well.

In certain embodiments, a method for locating a metallic structure within a formation may comprise drilling a wellbore in a formation using a drill attached to drill string, the drill string comprising a ranging tool comprising a magnetic sensor pair; exciting a metallic structure with an electric current; aligning the magnetic sensor pair with the metallic structure; measuring at least one of a magnetic field and a magnetic field gradient generated from the metallic structure with the magnetic sensor pair; determining a distance of the metallic structure from the ranging tool; adjusting the drilling parameters in response to the distance of the metallic structure from the ranging tool.

In certain embodiments, a method for drilling a wellbore within a formation may comprise drilling a wellbore in a formation using a drill attached to drill string, the drill string comprising a ranging tool; exciting a metallic structure with an electric current; aligning the magnetic sensor pair with the metallic structure; measuring with the ranging tool at least one of a magnetic field and a magnetic field gradient generated from the metallic structure while rotating the drill string; determining a distance of the metallic structure from the ranging tool; measuring azimuthal orientation of the ranging tool/magnetic sensor pair with the azimuthal sensor; determining the direction of the metallic structure from the ranging tool; adjusting the drilling parameters in response to the distance and direction of the metallic structure from the ranging tool.

The present disclosure allows detection of a metallic structure within a formation through which a wellbore is being drilled. The distance and location information may allow a drilling operator to drill the wellbore within substantially consistent range of the metallic structure or may allow the drilling operator to drill into the metallic structure. As such, the ranging information provided by the present disclosure may be used to more accurately and efficiently drill a wellbore that is location sensitive. The present disclosure has discussed the metallic structure as being a production well for illustrative purposes, however, the metallic structure may be any structure excitable by an electric current and that generates a magnetic field in response to being excited by such an electric current.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for locating a metallic structure within a formation, comprising:
    drilling a wellbore in a formation using a drill string, the drill string comprising a ranging tool that comprises a magnetic sensor pair;
    exciting a metallic structure with an electric current;
    aligning the magnetic sensor pair with the metallic structure, wherein aligning the magnetic sensor pair with the metallic structure comprises detecting at least one of a radial component and a tangential component with the magnetic sensor pair and rotating the magnetic sensor pair until the radial component is at a minimum or the tangential component is at a maximum;
    measuring at least one of a magnetic field and a magnetic field gradient generated from the metallic structure with the magnetic sensor pair;
    determining a distance of the metallic structure from the ranging tool; and
    adjusting drilling parameters in response to the distance and direction of the metallic structure from the ranging tool.

2. The method of claim 1, wherein aligning the magnetic sensor pair with the metallic structure comprises rotating the magnetic sensor pair with a rotatable assembly.

3. The method of claim 1, further comprising measuring an azimuthal orientation of the ranging tool/magnetic sensor pair with an azimuthal sensor and determining the direction of the metallic structure from the ranging tool.

4. The method of claim 1, wherein measuring at least one of a magnetic field and a magnetic field gradient generated from the metallic structure with the magnetic sensor pair further comprises rotating the drill string while measuring.

5. The method of claim 1, wherein measuring a magnetic field generated from the metallic structure with the magnetic sensor pair further comprises keeping the drill string stationary while measuring.

6. A method A method for locating a metallic structure within a formation, comprising:
    drilling a wellbore in a formation using a drill string, the drill string comprising a ranging tool that comprises a magnetic sensor pair;
    exciting a metallic structure with an electric current;
    aligning the magnetic sensor pair with the metallic structure;
    measuring at least one of a magnetic field and a magnetic field gradient generated from the metallic structure with the magnetic sensor pair;
    determining a distance of the metallic structure from the ranging tool;
    adjusting drilling parameters in response to the distance and direction of the metallic structure from the ranging tool; and
    detecting a rotation of the drill string with at least one rotation sensor and rotating the magnetic sensor pair opposite the rotation of the drill string.

7. The method of claim 1, further comprising detecting a vibration of the drill string with at least one accelerometer and vibrating the magnetic sensor pair opposite the detected vibration.

8. The method of claim 1, further comprising powering the magnetic sensor pair with an inductive transformer coupling between a first coil attached to a ranging tool body and a second coil attached to a rotatable assembly.

9. The method of claim 6, wherein aligning the magnetic sensor pair with the metallic structure comprises rotating the magnetic sensor pair with a rotatable assembly.

10. The method of claim 6, further comprising measuring an azimuthal orientation of the ranging tool/magnetic sensor pair with an azimuthal sensor and determining the direction of the metallic structure from the ranging tool.

11. The method of claim 6, wherein measuring at least one of a magnetic field and a magnetic field gradient generated from the metallic structure with the magnetic sensor pair further comprises rotating the drill string while measuring.

12. The method of claim 6, wherein measuring a magnetic field generated from the metallic structure with the magnetic sensor pair further comprises keeping the drill string stationary while measuring.

13. The method of claim 6, further comprising detecting a vibration of the drill string with at least one accelerometer and vibrating the magnetic sensor pair opposite the detected vibration.

14. The method of claim 6, further comprising powering the magnetic sensor pair with an inductive transformer coupling between a first coil attached to a ranging tool body and a second coil attached to a rotatable assembly.

15. A method for locating a metallic structure within a formation, comprising:

running a wireline tool into a wellbore extending into a formation, wherein the wireline tool comprises a ranging tool;

exciting the metallic structure with an electric current;

aligning with the metallic structure a magnetic sensor pair attached to the ranging tool, wherein aligning the magnetic sensor pair with the metallic structure comprises detecting at least one of a radial component and a tangential component with the magnetic sensor pair and rotating the magnetic sensor pair until the radial component is at a minimum or the tangential component is at a maximum;

measuring with the magnetic sensor pair at least one of a magnetic field and a magnetic field gradient generated from the metallic structure while the wireline tool moves within the wellbore; and determining a distance of the metallic structure from the ranging tool.

16. The method of claim 15, further comprising measuring an azimuthal orientation of the ranging tool with an azimuthal sensor and determining the direction of the metallic structure from the ranging tool.

\* \* \* \* \*